(12) United States Patent
Kojima (10) Patent No.: US 11,255,404 B2
(45) Date of Patent: Feb. 22, 2022

(54) ANTI-VIBRATION DEVICE

(71) Applicant: BRIDGESTONE CORPORATION, Tokyo (JP)

(72) Inventor: Hiroshi Kojima, Tokyo (JP)

(73) Assignee: BRIDGESTONE CORPORATION, Tokyo (JP)

( * ) Notice: Subject to any disclaimer, the term of this patent is extended or adjusted under 35 U.S.C. 154(b) by 0 days.

(21) Appl. No.: 16/762,180

(22) PCT Filed: Nov. 8, 2018

(86) PCT No.: PCT/JP2018/041531
§ 371 (c)(1),
(2) Date: May 7, 2020

(87) PCT Pub. No.: WO2019/093430
PCT Pub. Date: May 16, 2019

(65) Prior Publication Data
US 2020/0362938 A1 Nov. 19, 2020

(30) Foreign Application Priority Data
Nov. 8, 2017 (JP) .............................. JP2017-215409

(51) Int. Cl.
*F16F 13/14* (2006.01)
*B60K 5/12* (2006.01)

(52) U.S. Cl.
CPC ...... *F16F 13/1481* (2013.01); *F16F 13/1463* (2013.01); *B60G 2204/41062* (2013.01);
(Continued)

(58) Field of Classification Search
CPC ............... F16F 13/1481; F16F 13/1463; F16F 2224/025; F16F 2228/008; F16F 2234/02; B60K 5/1208
See application file for complete search history.

(56) References Cited

U.S. PATENT DOCUMENTS 4,702,346 A * 10/1987 Uno .................. F16F 13/14
181/207
5,013,012 A * 5/1991 Jouade ................ F16F 13/1463
267/140.12
(Continued)

FOREIGN PATENT DOCUMENTS

CN 1625661 A 6/2005
CN 101253347 A 8/2008
(Continued)

OTHER PUBLICATIONS

International Search Report for PCT/JP2018/041531 dated Dec. 25, 2018 [PCT/ISA/210].
(Continued)

*Primary Examiner* — Xuan Lan Nguyen
(74) *Attorney, Agent, or Firm* — Sughrue Mion, PLLC (57) ABSTRACT

The anti-vibration device (1) includes: an inner attachment member (11); an outer cylinder (12) that surrounds the inner attachment member; and elastic bodies (31, 32) that elastically couple the inner attachment member and the outer cylinder. The elastic bodies include: a pair of end elastic bodies (31) fitted in the outer cylinder; and a pair of intermediate elastic bodies (32) separately arranged on both sides of the inner attachment member and between the end elastic bodies. Covering members (17) that form liquid chambers (14a, 14b) between the covering members and the inner attachment member is arranged between the inner attachment member and the outer cylinder. An orifice passage that provides communication between the liquid chambers is formed between the covering members and the outer cylinder. The entire intermediate elastic bodies are formed of rubber material. The covering members surround the entire circumference of the inner attachment member from outside thereof in a radial direction and cause compressive defor-
(Continued)

mation of the intermediate elastic bodies inward in the radial direction and inward in a circumferential direction.

4 Claims, 7 Drawing Sheets

(52) U.S. Cl.
CPC ....... *B60K 5/1208* (2013.01); *F16F 2224/025* (2013.01); *F16F 2228/008* (2013.01); *F16F 2234/02* (2013.01)

(56) References Cited

U.S. PATENT DOCUMENTS

| | | | |
|---|---|---|---|
| 5,178,375 A | 1/1993 | Hamaekers et al. | |
| 5,228,662 A * | 7/1993 | Kojima | F16F 13/30 267/140.12 |
| 8,534,647 B2 * | 9/2013 | Schnaars | F16F 13/1481 267/140.12 |
| 9,163,695 B2 * | 10/2015 | Saito | F16F 13/1463 |
| 9,222,543 B2 * | 12/2015 | Saito | F16F 13/16 |
| 9,279,473 B2 * | 3/2016 | Matsushita | F16F 13/1463 |
| 10,145,442 B2 * | 12/2018 | Ditzel | F16F 13/14 |
| 2004/0056397 A1* | 3/2004 | Tatura | F16F 1/387 267/140.12 |
| 2006/0071379 A1 | 4/2006 | Kato et al. | |
| 2007/0045918 A1 | 3/2007 | Thornhill et al. | |
| 2007/0158889 A1 | 7/2007 | Rooke et al. | |
| 2010/0213650 A1 | 8/2010 | Katayama et al. | |
| 2012/0098176 A1* | 4/2012 | Matsushita | F16F 13/1481 267/140.13 |
| 2015/0102543 A1* | 4/2015 | Moon | F16F 13/1409 267/140.12 |
| 2016/0146287 A1 | 5/2016 | Mysin et al. | |
| 2017/0299011 A1 | 10/2017 | Kojima et al. | |
| 2018/0087567 A1 | 3/2018 | Palluck et al. | |
| 2018/0223946 A1 | 8/2018 | Kojima | |

FOREIGN PATENT DOCUMENTS

| | | |
|---|---|---|
| CN | 101813154 A | 8/2010 |
| DE | 10 2006 061 646 A1 | 7/2007 |
| EP | 0 490 036 A2 | 6/1992 |
| EP | 2 657 566 A2 | 10/2013 |
| JP | 04-337129 A | 11/1992 |
| JP | 2005214367 A | 8/2005 |
| JP | 2005282780 A | 10/2005 |
| JP | 2016-075320 A | 5/2016 |
| JP | 2016-133181 A | 7/2016 |
| JP | 6207280 B | 10/2017 |
| WO | 2016193201 A3 | 12/2016 |
| WO | 2017038357 A1 | 3/2017 |

OTHER PUBLICATIONS

Search Report dated Apr. 2, 2021, from the China National Intellectual Property Administration in application No. 201880072545.X.

Extended European Search Report dated Jul. 30, 2021 by the European Patent Office in application No. 18877095.2.

* cited by examiner

ANTI-VIBRATION DEVICE

CROSS REFERENCE TO RELATED APPLICATIONS

This application is a National Stage of International Application No. PCT/JP2018/041531 filed Nov. 8, 2018, claiming priority based on Japanese Patent Application No. 2017-215409 filed Nov. 8, 2017.

TECHNICAL FIELD

The present invention relates to an anti-vibration device.

BACKGROUND ART

A conventional anti-vibration device, which includes an inner attachment member coupled to either one of a vibration generator and a vibration receiver, an outer cylinder coupled to the other of the vibration generator and the vibration receiver and surrounding the inner attachment member, and elastic bodies elastically coupling the inner attachment member and the outer cylinder, is known.

As this type of anti-vibration device, a configuration as shown in, for instance, Patent Document 1 is known in which the elastic bodies include a pair of end elastic bodies that are disposed at an interval in an axial direction along a central axis of the outer cylinder and are fitted in the outer cylinder, and a pair of intermediate elastic bodies that are separately arranged on both sides of the inner attachment member in a radial direction and between the end elastic bodies, covering members, which cover spaces between the intermediate elastic bodies adjacent to each other in a circumferential direction from outside of the intermediate elastic bodies in the radial direction to form liquid chambers, are arranged between the inner attachment member and the outer cylinder, and an orifice passage that provides communication between the liquid chambers is formed between the covering members and the outer cylinder. The intermediate elastic bodies are formed of rubber material, and reinforcing bodies are embedded therein.

DOCUMENT OF RELATED ART

Patent Document

[Patent Document 1] Japanese Unexamined Patent Application, First Publication No. 2016-133181

SUMMARY OF INVENTION

Technical Problem

However, in the conventional anti-vibration device, a modulus of the anti-vibration device, which is expressed when the inner attachment member moves relative to the outer cylinder and the covering members in the radial direction, increases excessively in a direction of the radial direction, in which the pair of intermediate elastic bodies are arranged (a direction in which the pair of intermediate elastic bodies face each other), compared to that in another direction, and thereby portions to which a large load is applied may occur in the end elastic bodies fitted in the outer cylinder due to, for instance, occurrence of a twist in the axial direction.

The present invention is made in consideration of this circumstance and is directed to providing an anti-vibration device that can limit portions to which a large load is applied from occurring in end elastic bodies fitted in an outer cylinder.

Solution to Problem

In order to achieve the object of solving the above problem, an anti-vibration device of an aspect of the present invention includes: an inner attachment member coupled to either one of a vibration generator and a vibration receiver; an outer cylinder coupled to the other of the vibration generator and the vibration receiver and surrounding the inner attachment member; and elastic bodies elastically coupling the inner attachment member and the outer cylinder. The elastic bodies include: a pair of end elastic bodies that are disposed at an interval in an axial direction along a central axis of the outer cylinder and are fitted in the outer cylinder; and a pair of intermediate elastic bodies that are separately arranged on both sides of the inner attachment member in a radial direction intersecting the central axis in a plan view viewed in the axial direction and between the end elastic bodies. Covering members, which cover spaces between the intermediate elastic bodies adjacent to each other in a circumferential direction orbiting around the central axis in the plan view from outside of the intermediate elastic bodies in the radial direction to form liquid chambers between the covering members and the inner attachment member, are arranged between the inner attachment member and the outer cylinder. An orifice passage that provides communication between the liquid chambers is formed between the covering members and the outer cylinder. The entire intermediate elastic bodies are formed of rubber material. The covering members surround an entire circumference of the inner attachment member from outside thereof in the radial direction and cause compressive deformation of the intermediate elastic bodies inward in the radial direction and inward in the circumferential direction.

DESCRIPTION OF EMBODIMENTS

Hereinafter, an embodiment of an anti-vibration device of the present invention will be described with reference to FIGS. 1 to 7.

An anti-vibration device 1 of the present embodiment includes an inner attachment member 11 that is coupled to either one of a vibration generator and a vibration receiver, an outer cylinder 12 that is coupled to the other of the vibration generator and the vibration receiver and surrounds the inner attachment member 11, and elastic bodies 31 and 32 that elastically couple the inner attachment member 11 and the outer cylinder 12.

The anti-vibration device 1 is used as, for instance, a suspension bushing or an engine mount for a vehicle, or a mount of an industrial machine installed in a factory.

Hereinafter, a direction along a central axis O of the outer cylinder 12 is referred to as an axial direction, a direction intersecting the central axis O in a plan view viewed in the axial direction is referred to as a radial direction, and a direction orbiting around the central axis O is referred to as a circumferential direction.

Figure 1:
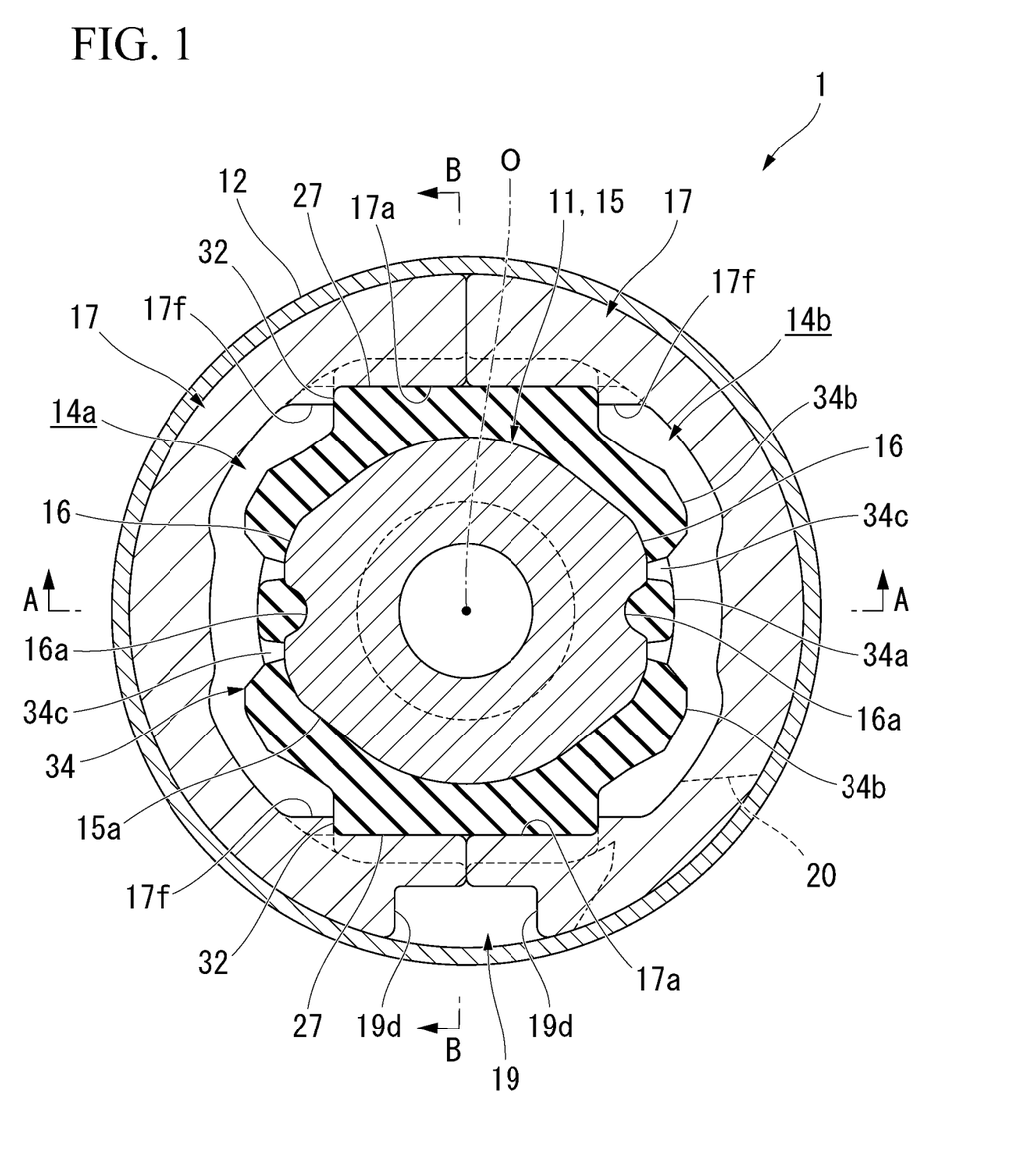
FIG. 1 is a lateral cross-sectional view of the middle in an axial direction of an anti-vibration device shown as an embodiment of the present invention.
Figure 2:
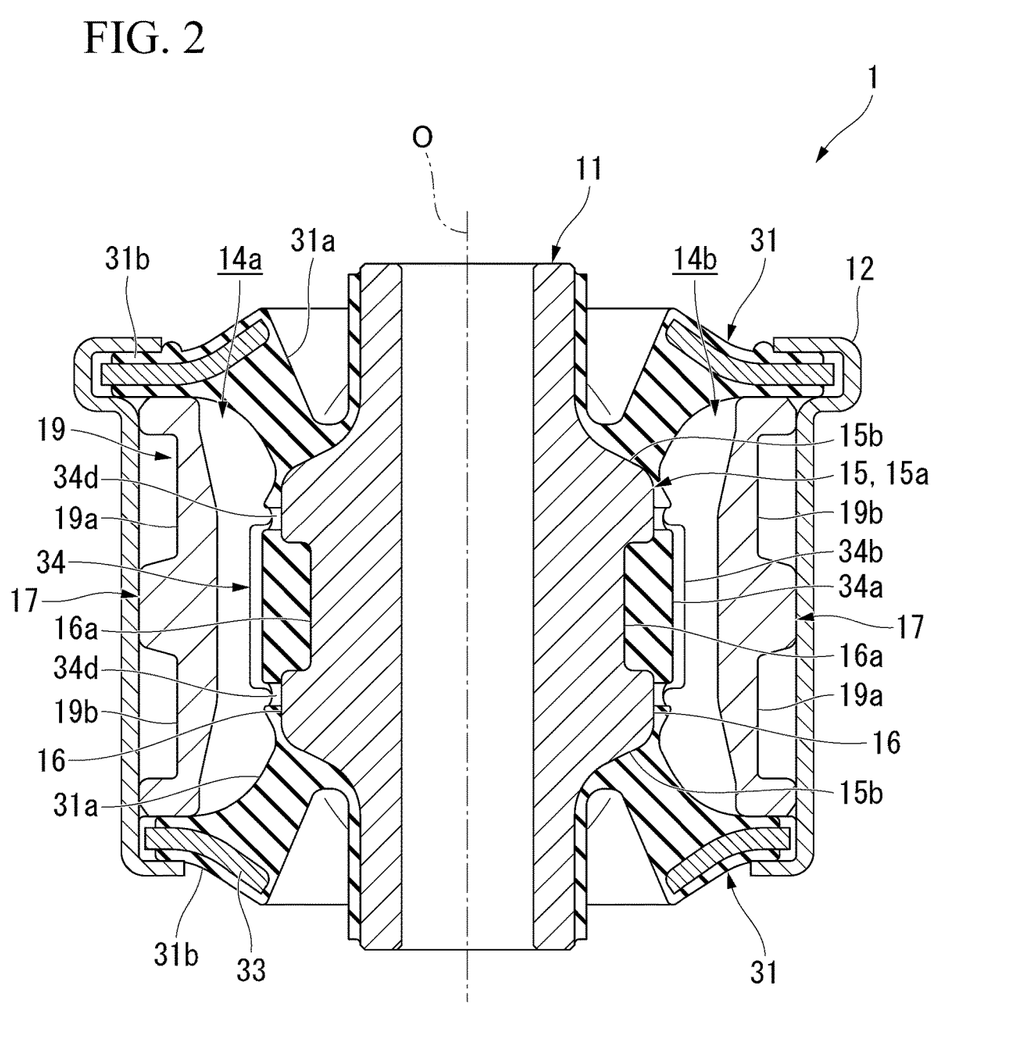
FIG. 2 is a cross-sectional view taken along line A-A of the anti-vibration device shown in FIG. 1.
Figure 3:
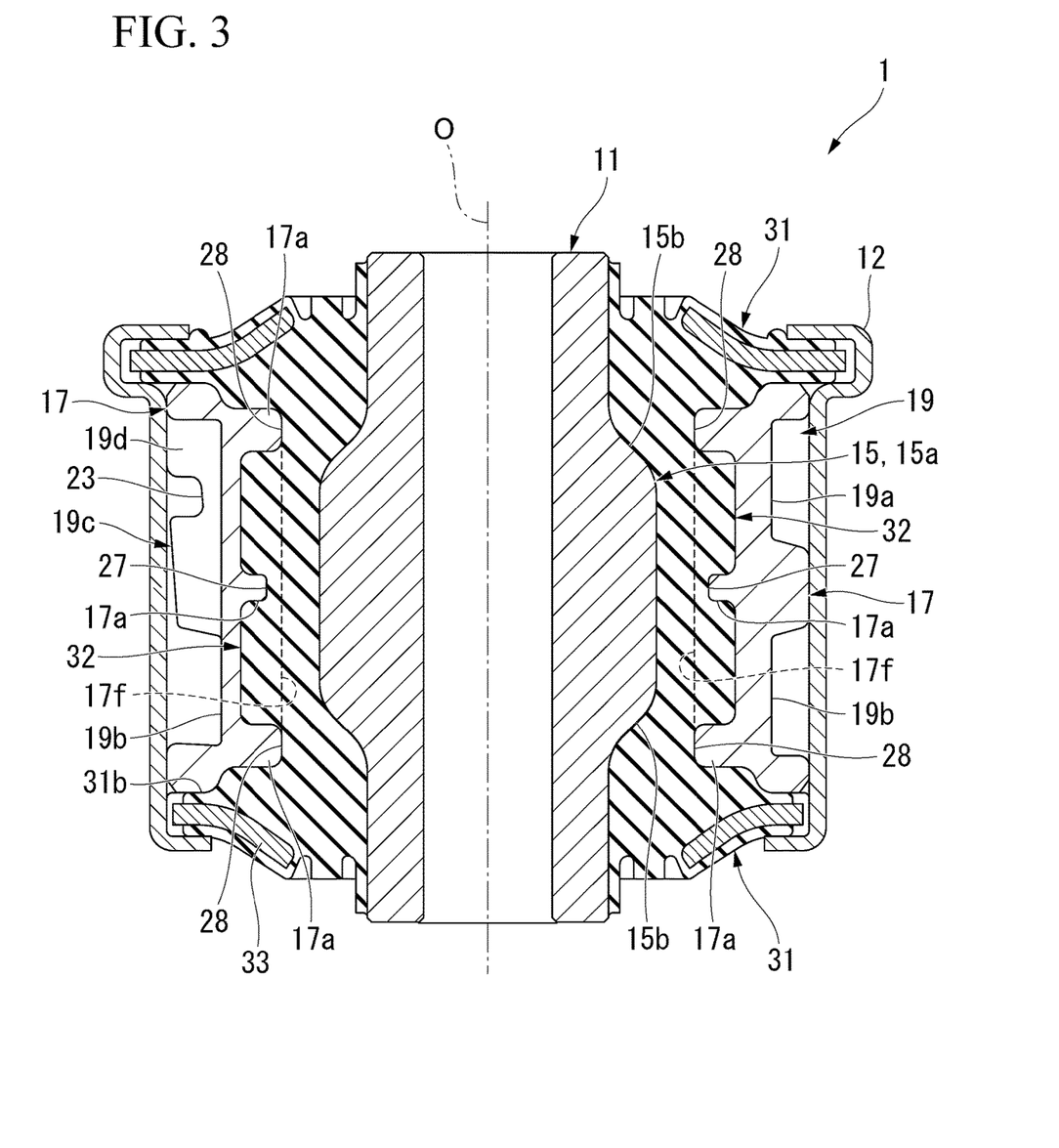
FIG. 3 is a cross-sectional view taken along line B-B of the anti-vibration device shown in FIG. 1.

As shown in FIGS. 1 to 3, the inner attachment member 11 is formed in a cylindrical shape arranged coaxially with the central axis O. A bulge 15 bulging outward in the radial direction is formed at an intermediate portion of the inner attachment member 11 in the axial direction on the entire circumference thereof. The bulge 15 is formed in the middle of the inner attachment member 11 in the axial direction. A top face 15a of the bulge 15, which is directed outward in the radial direction, extends in the circumferential direction and in the axial direction. The bulge 15 is disposed inside the outer cylinder 12. The inner diameter of the inner attachment member 11 is equalized on the entire length thereof in the axial direction. Opposite ends of the inner attachment member 11 in the axial direction protrude outward from the outer cylinder 12 in different directions parallel with the axial direction. FIG. 1 is a lateral cross-sectional view of the middle in the axial direction of the anti-vibration device 1, which is perpendicular to the central axis O.

The elastic bodies 31 and 32 are formed of rubber material and are adhered to an outer circumferential surface of the inner attachment member 11 by vulcanization. The elastic bodies 31 and 32 include a pair of end elastic bodies 31 that are disposed at an interval in the axial direction and are fitted in the outer cylinder 12, and a pair of intermediate elastic bodies 32 that are arranged between the end elastic bodies 31 and are disposed at an interval in the circumferential direction.

The end elastic bodies 31 are separately arranged on opposite end faces 15b, which radially extend inward from opposite ends of the top face 15a in the axial direction and are directed in the axial direction, within the surface of the bulge 15. The end faces 15b gradually extend outward in the axial direction as they go inward from the top face 15a in the radial direction. Each of the end elastic bodies 31 includes a tubular part 31a that gradually extends outward in the radial direction as it goes outward from the end face 15b of the bulge 15 in the axial direction, and a flange part 31b that radially protrudes outward from an outside end of the tubular part 31a in the axial direction and continuously extends on the entire circumference. The tubular part 31a and the flange part 31b are disposed coaxially with the central axis O. The flange part 31b is axially located on an inner side of the end of the inner attachment member 11 in the axial direction. An annular reinforcing plate 33 is embedded in the flange part 31b. The reinforcing plate 33 is formed of, for instance, a hard material such as a metallic material or a synthetic resin material. The pair of end elastic bodies 31 are formed in shapes and sizes, which are equal to each other.

Figure 6:
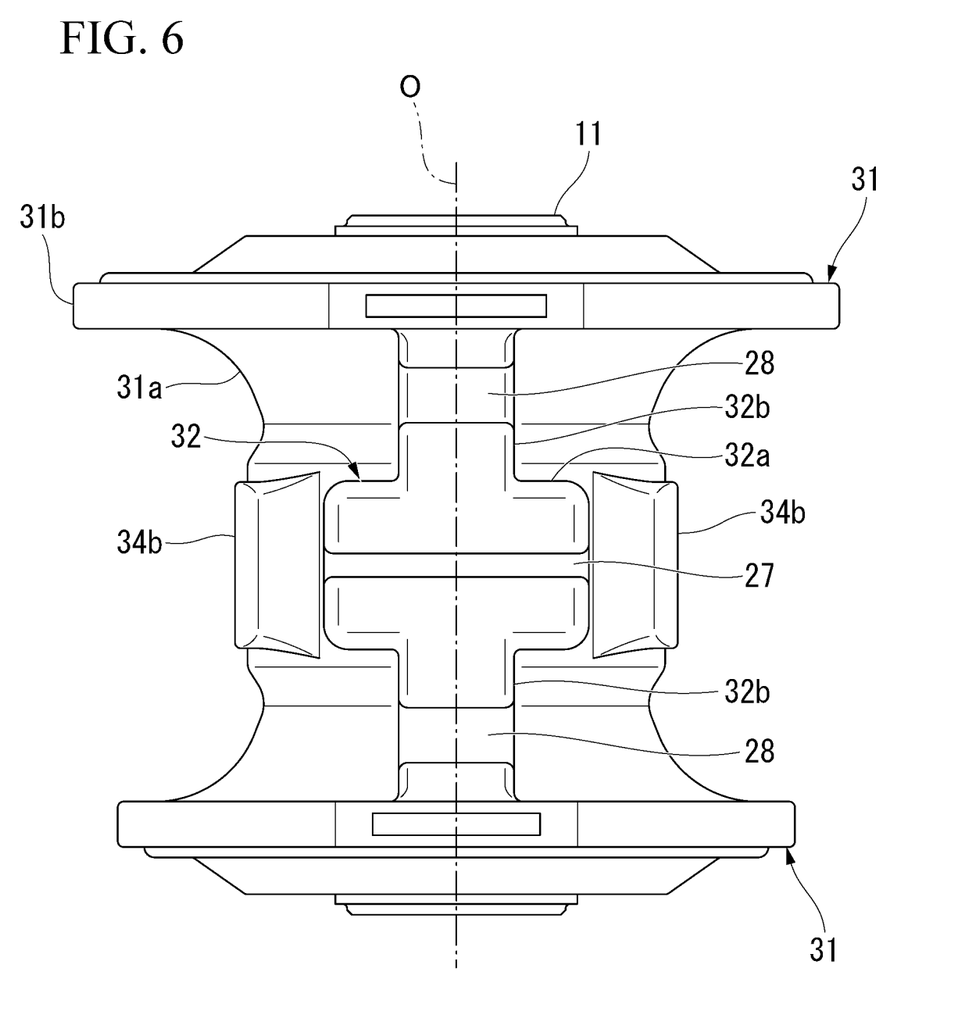
FIG. 6 is a side view showing intermediate elastic bodies when viewed from the front thereof in a state in which the covering members are removed from the anti-vibration device shown in FIGS. 4 and 5.

The intermediate elastic bodies 32 are separately arranged on both sides of the inner attachment member 11 in the radial direction. The entire intermediate elastic bodies 32 are formed of a rubber material. As shown in FIG. 6, each of the intermediate elastic bodies 32 includes a main part 32a that is arranged on the middle of the inner attachment member 11 in the axial direction, and a pair of sub-parts 32b that separately protrude outward from the main part 32a in different directions parallel with the axial direction and each have a volume less than the main part 32a. In a front view viewed from outside in the radial direction, each of the main part 32a and the sub-parts 32b has a rectangular shape in which a pair of side parts extend in the circumferential direction and the other pair of side parts extend in the axial direction. The sub-parts 32b are connected to the middle of the main part 32a in the circumferential direction. Outer ends of the sub-parts 32b in the axial direction are connected to the flange parts 31b of the end elastic bodies 31. An outer surface of each of the main part 32a and the sub-parts 32b, which is directed outward in the radial direction, has a flat surface that extends in both directions of a transverse direction perpendicular to the axial direction and the axial direction in a front view viewed from outside in the radial direction. The outer surfaces of the main part 32a and the sub-parts 32b are connected without a difference in level. The pair of intermediate elastic bodies 32 are formed in shapes and sizes, which are equal to each other. The size of the main part 32a in the circumferential direction is greater than those of the sub-parts 32b in the circumferential direction. The size of the main part 32a in the axial direction is less than those of the sub-parts 32b in the axial direction.

Here, as shown in FIG. 1, recesses 16a recessed inward in the radial direction are formed in stoppers 16 that are located between the intermediate elastic bodies 32 adjacent to each other in the circumferential direction, within the bulge 15 of the inner attachment member 11. The recesses 16a are formed in groove shapes that extend in the axial direction. The recesses 16a have rectangular shapes that are long in the axial direction when viewed from outside in the radial direction. When the inner attachment member 11 and the outer cylinder 12 move relatively to be close to each other, the stoppers 16 are formed to be able to come into contact with inner surfaces (close to an inner circumferential surface of the outer cylinder 12) of covering members 17 (to be described below). The stoppers 16 are radially located outside another portion of the bulge 15, and the top face 15a of the bulge 15 has an oval shape in a plan view viewed in the axial direction. In the plan view, the top face 15a within the stoppers 16 is formed in a circular arc shape whose center is the central axis O.

The recesses 16a are formed in intermediate portions of the stoppers 16 in the circumferential direction. In the shown example, the recesses 16a are formed in the middles of the stoppers 16 in the circumferential direction. As shown in FIG. 2, the recesses 16a are formed in portions that are axially located inside opposite end edges of the top face 15a of the stoppers 16 in the axial direction. That is, opposite ends of the recesses 16a in the axial direction do not open to the opposite end faces 15b of the stoppers 16. In the shown example, the recesses 16a are formed in portions that are circumferentially located inside opposite end edges of the top face 15a of the stoppers 16 in the circumferential direction. Openings of the recesses 16a are formed in protuberant curved shapes. In a lateral cross-sectional view perpendicular to the central axis O, the recesses 16a are formed in concave curved shapes that are recessed inward in the radial direction. Within the top face 15a of the stoppers 16, portions located between the openings of the recesses 16a and the end edges of the top face 15a in the axial direction extend in a linear shape in the axial direction in a vertical cross-sectional view in the axial direction.

In the present embodiment, stopper elastic part 34 that cover the stoppers 16 are provided. The stoppers 16 and the stopper elastic parts 34 are arranged between the intermediate elastic bodies 32 adjacent to each other in the circumferential direction. The stopper elastic parts 34 and the elastic bodies 31 and 32 are integrally formed of, for instance, a rubber material. The entire outer circumferential surface of the inner attachment member 11 is covered with, for instance, a rubber material.

As shown in FIG. 1, in each stopper elastic part 34, outer portions 34b, which are circumferentially located outside an inner portion 34a that covers the recess 16a of the stopper 16, protrude outward from the inner portion 34a in the radial direction. That is, the inner portion 34a and the outer portions 34b are disposed at positions different from each other in the circumferential direction, and the positions of the outer portions 34b in the radial direction are further away from the central axis O than the position of the inner portion 34a in the radial direction. An outer surface of the inner portion 34a is formed in a circular arc shape whose center is the central axis O. Outer surfaces of the outer portions 34b are formed in curved shapes that protrude outward in the radial direction. In a lateral cross-sectional view perpendicular to the central axis O, a radius of curvature of the outer surface of each inner portion 34a is greater than that of the outer surface of each outer portion 34b. The sizes of the outer portions 34b and the main parts 32a of the intermediate elastic bodies 32 in the axial direction are equal to each other, and the positions of the outer portions 34b and the main parts 32a in the axial direction are equal to each other.

Figure 7:
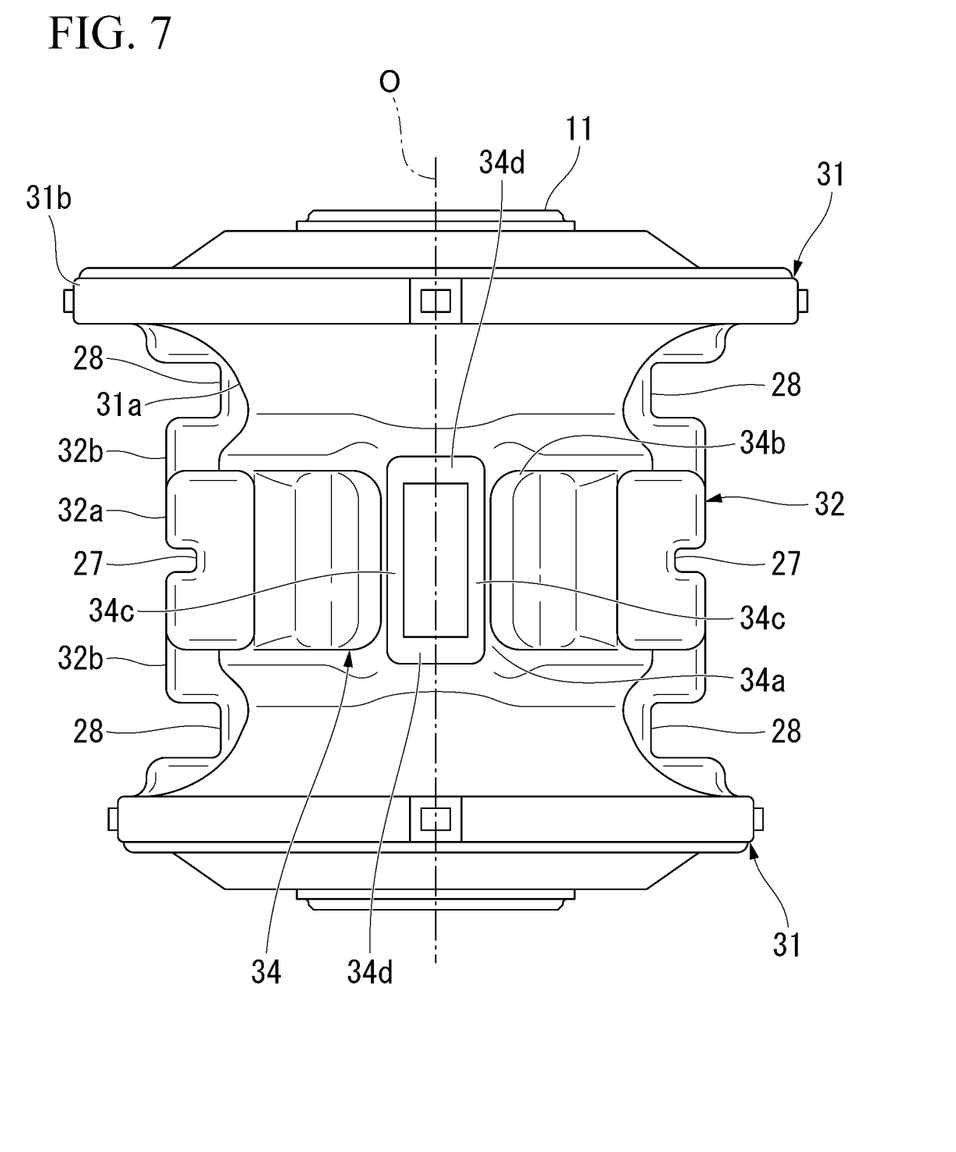
FIG. 7 is a side view showing a stopper elastic part when viewed from the front thereof in the state in which the covering members are removed from the anti-vibration device shown in FIGS. 4 and 5.

The inner portion 34a and the outer portions 34b are disconnected in the circumferential direction. As shown in FIG. 7, the disconnection portions (hereinafter referred to as first disconnection portions) 34c are formed at connection portions of the inner portion 34a and the two outer portions 34b in the stopper elastic part 34 on the entire length of the connection portions in the axial direction. Opposite ends of the first disconnection portion 34c in the axial direction are axially located outside opposite ends of the outer portion 34b in the axial direction. The opposite ends of the first disconnection portion 34c in the axial direction are axially located outside the recess 16a on the top face 15a of the stopper 16. As shown in FIG. 1, the first disconnection portions 34c are disposed at positions that are away from both the opposite end edges of the top face 15a of the stopper 16 in the circumferential direction and the opening of the recess 16a.

The first disconnection portions 34c have long holes that penetrate through the stopper elastic part 34 in the radial direction, and extend in the axial direction while having widths in the circumferential direction. A portion of the inner portion 34a, which is disposed between the two first disconnection portions 34c in the circumferential direction, has a size in the circumferential direction less than the outer portion 34b in the circumferential direction.

As shown in FIGS. 2 and 7, the stopper elastic part 34 and the end elastic bodies 31 are disconnected in the axial direction. The disconnection portions (hereinafter referred to as second disconnection portions) 34d have long holes that penetrate through the stopper elastic part 34 in the radial direction, and extend in the circumferential direction while having widths in the axial direction. The second disconnection portions 34d are formed at opposite ends of the stopper elastic part 34 in the axial direction. The second disconnection portions 34d disconnect the inner portion 34a of the stopper elastic part 34 and the end elastic bodies 31 in the axial direction. The second disconnection portions 34d may disconnect the entire stopper elastic part 34, which includes the inner portion 34a and the outer portions 34b, and the end elastic bodies 31 in the axial direction.

An outer end of the second disconnection portion 34d in the axial direction is axially located outside the end of the outer portion 34b in the axial direction, and an inner end of the second disconnection portion 34d in the axial direction is axially located inside the end of the outer portion 34b in the axial direction. The second disconnection portion 34d is located at a portion that is axially located inside the end edge of the top face 15a of the stopper 16 in the axial direction and outside the opening of the recess 16a in the axial direction. The second disconnection portion 34d is disposed at a portion that is located inside the two outer portions 34b in the stopper elastic part 34 in the circumferential direction.

In the shown example, an end of the second disconnection portion 34d in the circumferential direction is connected to an end of the first disconnection portion 34c in the axial direction, and the second disconnection portions 34d and the first disconnection portions 34c have a rectangular frame shape when viewed from outside in the radial direction. The width of the second disconnection portion 34d (the width in the axial direction) is slightly greater than the width of the first disconnection portion 34c (the width in the circumferential direction).

The covering members 17, which cover spaces between the intermediate elastic bodies 32 adjacent to each other in the circumferential direction from outside of the intermediate elastic bodies 32 in the radial direction to form liquid chambers 14a and 14b between the covering members 17 and the inner attachment member 11, are arranged between the inner attachment member 11 and the outer cylinder 12. The covering members 17 are formed of, for instance, a synthetic resin material that is harder than the material of which the elastic bodies 31 and 32 are formed. The stoppers 16 and the stopper elastic parts 34 are arranged between the intermediate elastic bodies 32 adjacent to each other in the circumferential direction, and constitute parts of partition walls of the liquid chambers 14a and 14b.

A liquid in which a kinematic viscosity at 40° C. is 50 cSt or higher and 1000 cSt or lower and preferably 500 cSt or higher and 1000 cSt or lower is filled in the liquid chambers 14a and 14b. Measurement of the kinematic viscosity is based on JIS K2283 and can be performed by a B-type viscometer (manufactured by Tokimec, Inc.). The liquid includes, for instance, silicone oil.

The covering members 17 surround the entire circumference of the inner attachment member 11 from outside thereof in the radial direction. The inner surfaces of the covering members 17 are liquid-tightly in contact with the outer surfaces of the intermediate elastic bodies 32 and are not in contact with the stopper elastic parts 34.

Here, as shown in FIG. 2, a corresponding portion that is at least located on the recess 16a, within an outer surface of the stopper elastic part 34 which faces the inner surface of the covering member 17, and a facing portion that at least faces the corresponding portion of the outer surface of the stopper elastic part 34, within the inner surface of the covering member 17, extend in the axial direction on the entire area thereof in a vertical cross-sectional view in the axial direction. In the shown example, in the vertical cross-sectional view, the corresponding portion of the outer surface of the stopper elastic part 34 and the facing portion of the inner surface of the covering member 17 are substantially parallel to each other.

A portion of the inner surface of the covering member 17, which is from another portion facing a circumferential edge of the opening of the recess 16*a* on the top face 15*a* of the stopper 16 via the stopper elastic part 34 in the radial direction to the facing portion, extends in the axial direction in the vertical cross-sectional view. A portion of the inner surface of the covering member 17, which faces the end of the stopper 16 in the axial direction via the stopper elastic part 34 in the radial direction, gradually extends outward in the radial direction as it goes outward in the axial direction.

As shown in FIG. 1, within the inner surface of the covering member 17, a portion that faces an outer surface of the inner portion 34*a* of the stopper elastic part 34 is formed in a circular arc shape whose center is the central axis O, and a portion that faces an outer surface of the outer portion 34*b* of the stopper elastic part 34 is formed in a concave curved shape that is recessed outward in the radial direction. In a lateral cross-sectional view perpendicular to the central axis O, within the inner surface of the covering member 17, the portion that faces the outer surface of the inner portion 34*a* of the stopper elastic part 34 has a greater radius of curvature than the portion that faces the outer surface of the outer portion 34*b* of the stopper elastic part 34. Within the inner surface of the covering member 17, the portion that faces the outer surface of the stopper elastic part 34 is formed in a shape along a shape of the outer surface of the stopper elastic part 34. In the lateral cross-sectional view, within the inner surface of the covering member 17, the portion that faces the outer surface of the stopper elastic part 34 is substantially parallel to the outer surface of the stopper elastic part 34.

The plurality of covering members 17 are arranged in the circumferential direction, circumferential end edges thereof are butted against each other, and thus the covering members 17 have a cylindrical shape as a whole. In the shown example, the two covering members 17 are arranged and formed in half tubular shapes. The covering members 17 cover the entire circumference of the intermediate elastic bodies 32. The circumferential end edges of the covering members 17 are located in the middles of the intermediate elastic bodies 32 in the circumferential direction. That is, the circumferential end edges of the covering members 17 are disposed to radially face the middles of the intermediate elastic bodies 32 in the circumferential direction.

The covering members 17 cause compressive deformation of the intermediate elastic bodies 32 inward in the radial direction and inward in the circumferential direction. That is, compressive forces are applied to the intermediate elastic bodies 32 in different directions parallel with the radial direction and in different directions parallel with the circumferential direction. In other words, the covering members 17 apply the compressive forces in the radial direction and in the circumferential direction to the intermediate elastic bodies 32. In the shown example, pressure contact protrusions 17*f*, which protrude inward in the radial direction and are in pressure contact with the end faces of the intermediate elastic bodies 32 in the circumferential direction, are separately formed at opposite ends of the inner surface of the single covering member 17 in the circumferential direction. In the pressure contact protrusion 17*f*, a pressure contact surface that is in pressure contact with the end face of the intermediate elastic body 32 in the circumferential direction is a flat surface that is directed outward in the circumferential direction in the covering member 17 and that extends in the axial direction.

Figure 4:
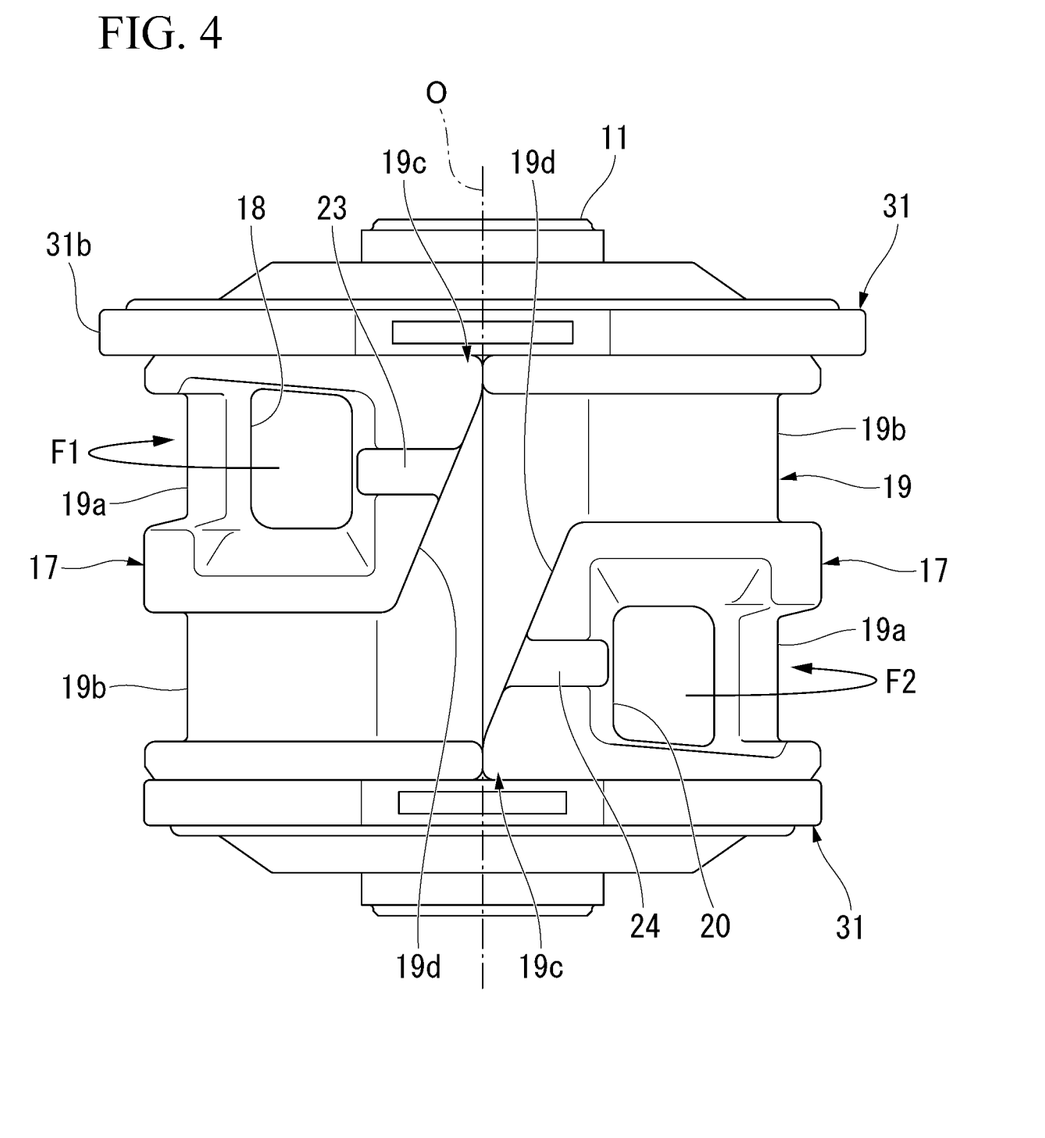
FIG. 4 is a side view showing one of two boundary portions in two covering members when viewed from outside thereof in a radial direction in a state in which an outer cylinder is removed from the anti-vibration device shown in FIGS. 1 to 3.

As shown in FIG. 4, a main body groove 19, a first communication opening 18 that opens to either one liquid chamber 14*a* of the liquid chambers 14*a* and 14*b* and the main body groove 19, and a second communication opening 20 that opens to the other liquid chamber 14*b* of the liquid chambers 14*a* and 14*b* and the main body groove 19 are formed in outer circumferential surfaces of the covering members 17.

The first communication opening 18 and the second communication opening 20 are separately formed in circumferential ends of the two covering members 17, which are adjacent to each other in the circumferential direction.

Figure 5:
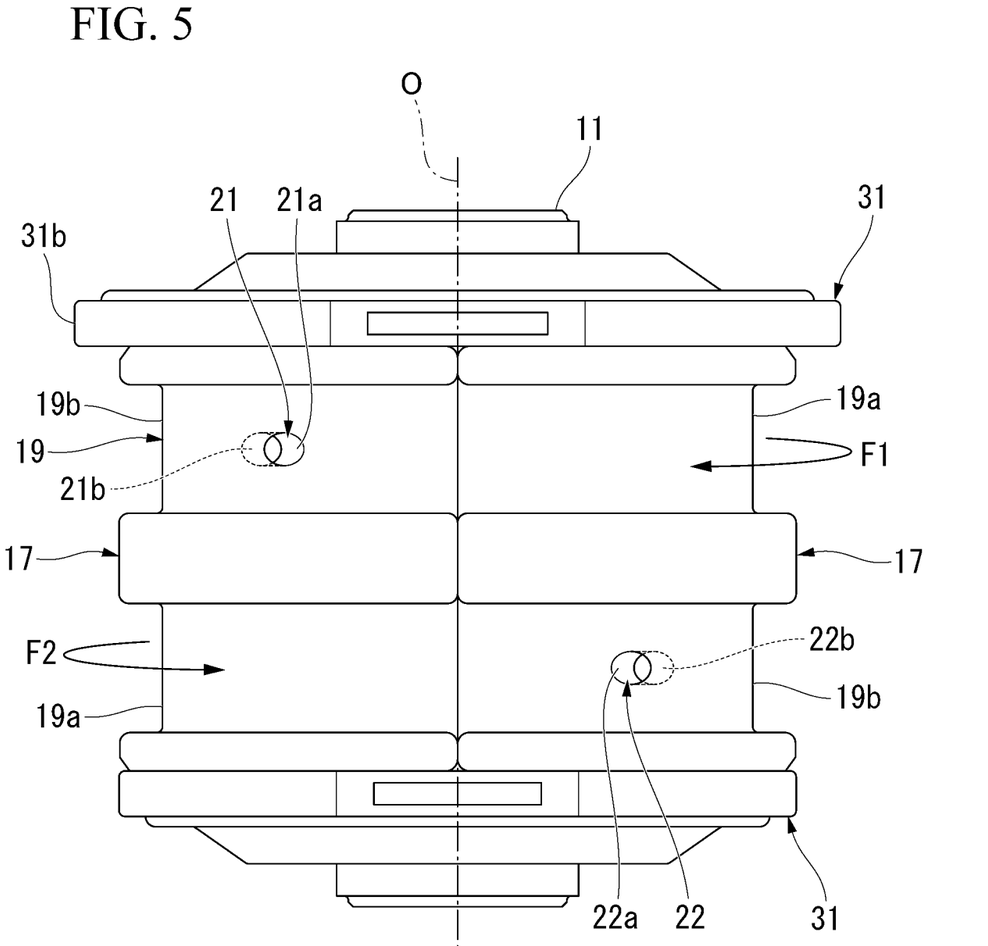
FIG. 5 is a side view showing the other of the two boundary portions in the two covering members when viewed from outside thereof in the radial direction in the state in which the outer cylinder is removed from the anti-vibration device shown in FIGS. 1 to 3.

As shown in FIGS. 4 and 5, the main body groove 19 includes a first groove 19*a*, which extends from one end thereof in the circumferential direction at which the first communication opening 18 or the second communication opening 20 is disposed toward the other end thereof in the circumferential direction in the outer circumferential surfaces of the covering members 17 and in which the other end thereof in the circumferential direction opens in the circumferential direction, and a second groove 19*b*, which is disposed at a position away from the first groove 19*a* in the axial direction and in which opposite ends thereof in the circumferential direction open in the circumferential direction. The one end of the first groove 19*a* in the circumferential direction is blocked in the circumferential direction by an end wall 19*c* that extends in the axial direction.

The two covering members 17 are formed in equal shape and size, and in a state in which the covering members 17 are inverted with respect to each other in the axial direction, the circumferential end edges thereof are disposed to continue in the circumferential direction.

Thus, the other end of the first groove 19*a* in the circumferential direction in one of the covering members 17 and the other end of the second groove 19*b* in the circumferential direction in the other of the covering members 17 are connected to each other, one end of the second groove 19*b* in the circumferential direction in one of the covering members 17 and one end of the second groove 19*b* in the circumferential direction in the other of the covering members 17 are connected to each other, and the other end of the second groove 19*b* in the circumferential direction in one of the covering members 17 and the other end of the first groove 19*a* in the circumferential direction in the other of the covering members 17 are connected to each other.

Here, as shown in FIG. 4, of opposite sides of the end wall 19*c* in the circumferential direction, outer sides 19*d* located outside the first groove 19*a* gradually extend toward the outside of the first groove 19*a* in a direction away from the second groove 19*b* in the axial direction. Thus, one end of the second groove 19*b* in the circumferential direction in one of the covering members 17 and one end of the second groove 19*b* in the circumferential direction in the other covering member 17 are connected through a gap between the outer sides 19*d* of the end wall 19*c* in the two covering members 17. The outer sides 19*d* of the end wall 19*c* in the two covering members 17 are nearly parallel to each other, and the gap extends in a linear shape in a direction that is inclined both in the axial direction and in the circumferential direction.

The outer cylinder 12 is integrally externally fitted on the two covering members 17. Thereby, the outer cylinder 12 and the inner attachment member 11 are elastically coupled, and an orifice passage that provides communication between the liquid chambers 14a and 14b is defined between the main body groove 19 and the inner circumferential surface of the outer cylinder 12. The orifice passage provides communication between the liquid chambers 14a and 14b through the first communication opening 18 and the second communication opening 20. The orifice passage runs between the covering members 17 and the outer cylinder 12 throughout at least one circumference and a half in the circumferential direction. In the shown example, the orifice passage runs between the covering members 17 and the outer cylinder 12 throughout nearly two circumferences in the circumferential direction.

When vibrations are input to the anti-vibration device 1, internal volumes of the liquid chambers 14a and 14b are changed while the elastic bodies 31 and 32 are elastically deformed. Thereby, the liquid in the liquid chambers 14a and 14b flows through the orifice passage to generate liquid column resonance, and thus the vibrations are attenuated and absorbed.

A first short-circuit through-hole 21 that short-circuits the liquid, which flows in the orifice passage from one liquid chamber 14a toward the other liquid chamber 14b, to reach the inside of the other liquid chamber 14b, and a second short-circuit through-hole 22 that short-circuits the liquid, which flows in the orifice passage from the other liquid chamber 14b toward one liquid chamber 14a, to reach the inside of one liquid chamber 14a are formed in a wall surface defining the orifice passage.

Flowing resistance of the liquid that passes through the first short-circuit through-hole 21 and the second short-circuit through-hole 22 is smaller than that of the orifice passage. A flow passage cross-sectional area of each of the first short-circuit through-hole 21 and the second short-circuit through-hole 22 is, for instance, about 3 mm$^2$ or more, and is smaller than that of the orifice passage. The length of each of the first short-circuit through-hole 21 and the second short-circuit through-hole 22 is shorter than that of the orifice passage.

The first short-circuit through-hole 21 and the second short-circuit through-hole 22 are formed in the outer circumferential surfaces of the covering members 17 and are formed in a groove bottom of the main body groove 19. The first short-circuit through-hole 21 and the second short-circuit through-hole 22 are separately formed in the two covering members 17. The first short-circuit through-hole 21 and the second short-circuit through-hole 22 are formed in the other end of the other covering member 17 which is connected to the other end of the first groove 19a in the circumferential direction, of opposite ends of the second groove 19b in the circumferential direction. Thus, the first short-circuit through-hole 21 opens to an end of the other liquid chamber 14b which is located on a rear side of a flowing direction F1 in which the liquid flows in the orifice passage from one liquid chamber 14a toward the other liquid chamber 14b. The second short-circuit through-hole 22 opens to an end of one liquid chamber 14a which is located on a rear side of a flowing direction F2 in which the liquid flows in the orifice passage from the other liquid chamber 14b toward one liquid chamber 14a.

The first short-circuit through-hole 21 is disposed at a position that is away from the first communication opening 18 in the flowing direction F1 by about 180° with respect to the central axis O, and the second short-circuit through-hole 22 is disposed at a position that is away from the second communication opening 20 in the flowing direction F2 by about 180° with respect to the central axis O.

The first short-circuit through-hole 21 and the second short-circuit through-hole 22 are disposed in the middle of the second groove 19b in the axial direction. An opening shape of each of the first short-circuit through-hole 21 and the second short-circuit through-hole 22 in the groove bottom of the main body groove 19 is an oval shape that is long in the circumferential direction.

Within an inner circumferential surface of the first short-circuit through-hole 21, a rear end face 21a, which is located at the end on the rear side in the flowing direction F1 in which the liquid flows in the orifice passage from one liquid chamber 14a toward the other liquid chamber 14b and is directed to a front side in the flowing direction F1, gradually extends toward the front side in the flowing direction F1 as it goes from the outside toward the inside in the radial direction. In the shown example, within the inner circumferential surface of the first short-circuit through-hole 21, a front end face 21b, which is located at an end on the front side in the flowing direction F1 and is directed to the rear side in the flowing direction F1, also gradually extends toward the front side in the flowing direction F1 as it goes from the outside toward the inside in the radial direction. The rear end face 21a and the front end face 21b in the first short-circuit through-hole 21 are nearly parallel to each other.

Within an inner circumferential surface of the second short-circuit through-hole 22, a rear end face 22a, which is located at the end on the rear side in the flowing direction F2 in which the liquid flows in the orifice passage from the other liquid chamber 14b toward one liquid chamber 14a and is directed to a front side in the flowing direction F2, gradually extends toward the front side in the flowing direction F2 as it goes from the outside toward the inside in the radial direction. In the shown example, within the inner circumferential surface of the second short-circuit through-hole 22, a front end face 22b, which is located at an end on the front side in the flowing direction F2 and is directed to the rear side in the flowing direction F2, also gradually extends toward the front side in the flowing direction F2 as it goes from the outside toward the inside in the radial direction. The rear end face 22a and the front end face 22b in the second short-circuit through-hole 22 are nearly parallel to each other.

As shown in FIG. 4, a third short-circuit through-hole 23, which short-circuits and opens to a side of a connection portion with the other liquid chamber 14b, is formed in a wall surface that defines a connection portion with one liquid chamber 14a in the orifice passage, and a fourth short-circuit through-hole 24, which short-circuits and opens to a side of the connection portion with one liquid chamber 14a, is formed in a wall surface that defines the connection portion with the other liquid chamber 14b in the orifice passage.

Flowing resistance of each of the third short-circuit through-hole 23 and the fourth short-circuit through-hole 24 is smaller than that of the orifice passage and is smaller than that of each of the first short-circuit through-hole 21 and the second short-circuit through-hole 22. A flow passage cross-sectional area of each of the third short-circuit through-hole 23 and the fourth short-circuit through-hole 24 is, for instance, about 3 mm$^2$ or more, and is smaller than that of the orifice passage and an opening area of each of the first communication opening 18 and the second communication opening 20. A length of each of the third short-circuit through-hole 23 and the fourth short-circuit through-hole 24 is shorter than that of the orifice passage.

The flowing resistance of each of the third short-circuit through-hole 23 and the fourth short-circuit through-hole 24 may be set to be greater than or equal to that of each of the first short-circuit through-hole 21 and the second short-circuit through-hole 22.

The third short-circuit through-hole 23 and the fourth short-circuit through-hole 24 are formed in the end walls 19c that define one end of the first groove 19a in the circumferential direction and extend in the axial direction, and extend in the circumferential direction. The third short-circuit through-hole 23 and the fourth short-circuit through-hole 24 are formed in an outer circumferential surface directed to the outside in the radial direction, of surfaces of the end walls 19c, and penetrate the end walls 19c in the circumferential direction. In a front view viewed from the outside in the radial direction, the third short-circuit through-hole 23 and the fourth short-circuit through-hole 24 extend in a linear shape in a direction perpendicular to the axial direction.

The third short-circuit through-hole 23 opens in a direction opposite to the flowing direction F1 in which the liquid flows in the orifice passage from one liquid chamber 14a toward the other liquid chamber 14b, and the fourth short-circuit through-hole 24 opens in a direction opposite to the flowing direction F2 in which the liquid flows in the orifice passage from the other liquid chamber 14b toward one liquid chamber 14a. The third short-circuit through-hole 23 and the fourth short-circuit through-hole 24 open toward one end of the second groove 19b in the circumferential direction in the other covering member 17.

The third short-circuit through-hole 23 and the fourth short-circuit through-hole 24 are formed in the middles of the end walls 19c in the axial direction. The third short-circuit through-hole 23 circumferentially comes close to the middle of the first communication opening 18 in the axial direction, and the fourth short-circuit through-hole 24 circumferentially comes close to the middle of the second communication opening 20 in the axial direction.

As the third and fourth short-circuit through-holes 23 and 24, a configuration that extends in the axial direction and opens to the second groove 19b of the same covering member 17 as the covering member 17 in which the third and fourth short-circuit through-holes 23 and 24 are formed may be adopted. Further, as the third and fourth short-circuit through-holes 23 and 24, a configuration that short-circuits and directly connects the connection portion of the orifice passage with the one liquid chamber 14a and the connection portion of the orifice passage with the other liquid chamber 14b may be adopted.

As shown in FIGS. 3, 6, and 7, groove-like leak passages 27 and 28 that are elastically deformed by internal pressures of the liquid chambers 14a and 14b, that thereby provide communication between the liquid chambers 14a and 14b, and that allow the liquid to flow between the liquid chambers 14a and 14b are formed in the intermediate elastic bodies 32. In the leak passages 27 and 28, since the covering members 17 elastically deform partition walls of the leak passages 27 and 28 in a standby state before the internal pressures of the liquid chambers 14a and 14b are changed, the communication between the liquid chambers 14a and 14b passing through the leak passages 27 and 28 is interrupted.

The leak passages 27 and 28 are formed in outer surfaces of the intermediate elastic bodies 32 which come into contact with the inner surfaces of the covering members 17. The leak passages 27 and 28 open to sides of the intermediate elastic bodies 32 which are directed in the circumferential direction. In a front view in which the outer surfaces of the intermediate elastic bodies 32 are viewed from the outside in the radial direction, the leak passages 27 and 28 extend in a linear shape in a direction perpendicular to the axial direction.

The plurality of leak passages 27 and 28 are formed in the intermediate elastic bodies 32 at different positions in the axial direction. In the shown example, the leak passages 27 and 28 are formed in the main part 32a and the pair of sub-parts 32b of the intermediate elastic bodies 32 one by one.

Among the plurality of leak passages 27 and 28, the first leak passage 27 formed in the main part 32a is disposed in the middle of the main part 32a in the axial direction, and the middles of the second leak passages 28 formed in the sub-parts 32b in the axial direction are axially located outside the middles of the sub-parts 32b in the axial direction. At least two of the plurality of leak passages 27 and 28 are different in flow passage length from each other. In the shown example, a length of the first leak passage 27 in the circumferential direction is longer than lengths of the second leak passages 28 in the circumferential direction. A width of the first leak passage 27 is narrower than those of the second leak passages 28.

In at least two of the plurality of leak passages 27 and 28, elastic deformation amounts of the partition walls of the leak passages 27 and 28 due to the covering members 17 are different from each other. In the present embodiment, the elastic deformation amount of the partition wall of first leak passage 27 due to the covering members 17 is greater than those of the partition walls of the second leak passages 28 due to the covering members 17. Internal pressures of the liquid chambers 14a and 14b by which the first leak passage 27 is opened are higher than those of the liquid chambers 14a and 14b by which the second leak passages 28 are opened.

The elastic deformation amount of the partition wall of first leak passage 27 due to the covering members 17 may be smaller than or equal to those of the partition walls of the second leak passages 28 due to the covering members 17. Further, the internal pressures of the liquid chambers 14a and 14b by which the first leak passage 27 is opened may be lower than or equal to those of the liquid chambers 14a and 14b by which the second leak passages 28 are opened.

Protrusion ribs 17a, which are separately inserted into the first leak passage 27 and the second leak passages 28, are formed in the inner surfaces of the covering members 17. The plurality of protrusion ribs 17a are formed in the inner surfaces of the covering members 17 at positions between which the central axis O is interposed in the radial direction at intervals in the axial direction, and the protrusion ribs 17a are separately inserted into the first leak passage 27 and the second leak passages 28. The protrusion ribs 17a are disposed in the first leak passage 27 and the second leak passages 28 over the full lengths thereof in the circumferential direction. The protrusion ribs 17a come into contact with the entire inner surfaces of the first leak passage 27 and the second leak passages 28.

Ends of the plurality of protrusion ribs 17a, which are disposed at intervals in the axial direction, in the circumferential direction are integrally connected in the axial direction by the pressure contact protrusions 17f extending in the axial direction. The protrusion ribs 17a are formed at opposite ends of the inner surface of the single covering member 17 in the circumferential direction. One of the protrusion ribs 17a is disconnected at the circumferential end edges of the covering members 17 in the circumferential direction, and the two covering members 17 are configured by a combination in the circumferential direction.

The first short-circuit through-hole 21, the second short-circuit through-hole 22, the third short-circuit through-hole 23, and the fourth short-circuit through-hole 24 are located outside the first leak passage 27 in the axial direction and inside the second leak passages 28 in the axial direction.

As described above, according to the anti-vibration device 1 of the present embodiment, since the entire intermediate elastic bodies 32 are formed of a rubber material, and no reinforcing bodies are embedded in the intermediate elastic bodies 32, a modulus of the anti-vibration device 1, which is expressed when the inner attachment member 11 moves relative to the outer cylinder 12 and the covering members 17 in the radial direction, can be inhibited from excessively increasing in a direction in which the pair of intermediate elastic bodies 32 are located and which is a part of the radial direction compared to another direction, and portions to which a large load is applied at the end elastic bodies 31 fitted in the outer cylinder 12 can be inhibited from occurring.

Moreover, since the covering members 17 cause compressive deformation of the intermediate elastic bodies 32 inward in the radial direction and inward in the circumferential direction, necessary rigidity can be provided to the intermediate elastic bodies 32 despite the fact that the entire intermediate elastic bodies 32 are formed of a rubber material without embedding reinforcing bodies in the intermediate elastic bodies 32.

Further, since the leak passages 27 and 28 are formed in the intermediate elastic bodies 32, when the internal pressure of either one of the liquid chambers 14a and 14b exceeds a prescribed value, the communication between the liquid chambers 14a and 14b can be provided through the leak passages 27 and 28, and the internal pressures of the liquid chambers 14a and 14b can be curbed. Thus, even if a liquid having a high kinematic viscosity of 50 cSt or higher at 40° C. is filled in the liquid chambers 14a and 14b, for example, a rise in dynamic stiffness and leakage of the liquid can be inhibited.

Further, when the internal pressures of the liquid chambers 14a and 14b exceed a prescribed value, the intermediate elastic bodies 32 themselves in which the leak passages 27 and 28 are formed are elastically deformed. Thereby, since the liquid chambers 14a and 14b communicate with each other, there is no need to arrange a valve body, and complication of a structure can be curbed.

Further, since the walls by which the leak passages 27 and 28 are defined in the intermediate elastic bodies 32 are elastically deformed by the covering members 17, the elastic deformation amounts of the partition walls of the leak passages 27 and 28 caused by the covering members 17 can be adjusted, and the internal pressures under which the liquid chambers 14a and 14b communicate with each other through the leak passages 27 and 28 can be easily adjusted.

Further, since the liquid having a high kinematic viscosity is filled in the liquid chambers 14a and 14b, a peak of an attenuation characteristic based on the liquid column resonance in the orifice passage is widened throughout a wide frequency range, and attenuation performance can be exerted in the wide frequency range.

Further, since the protrusion ribs 17a are fitted in the leak passages 27 and 28, despite the fact that the intermediate elastic bodies 32 are subjected to compressive deformation by the covering members 17, the leak passages 27 and 28 can be prevented from collapsing, and flowing of the liquid passing through the leak passages 27 and 28 when the internal pressures of the liquid chambers 14a and 14b exceed a prescribed value can be reliably secured.

Further, since the first leak passage 27 is formed in the main part 32a having a large volume among the main part 32a and the sub-parts 32b, the internal pressures of the liquid chambers 14a and 14b under which the first leak passage 27 is opened or closed by elastic deformation of the main part 32a can be easily and accurately adjusted.

Further, since at least two of the plurality of leak passages 27 and 28 are different in flow passage length from each other, and at least one of the plurality of leak passages 27 and 28 is different in flowing resistance from the other leak passages, the internal pressures of the liquid chambers 14a and 14b under which the leak passages 27 and 28 are opened can be set to a plurality of stages, and a rise in dynamic stiffness and leakage of the liquid can be inhibited.

Further, since the elastic deformation amounts of the partition walls of at least two of the plurality of leak passages 27 and 28 due to the covering members 17 are different from each other, and the elastic deformation amount of the partition wall of at least one of the plurality of leak passages 27 and 28 due to the covering members 17 is different from those of the other leak passages, the internal pressures of the liquid chambers 14a and 14b under which the leak passages 27 and 28 are opened can be set to a plurality of stages, and a rise in dynamic stiffness and leakage of the liquid can be inhibited.

The technical scope of the present invention is not limited to the above embodiment, and various changes and modifications can be made without departing from the spirit and scope of the present invention.

For example, in the above embodiment, the groove shape extending in the axial direction is shown as the recess 16a but is not limited thereto and may be appropriately changed, for example, such that a shape having a groove shape extending in the circumferential direction, a circular shape viewed from the outside in the radial direction, or a rectangular shape is adopted.

Further, the stoppers 16 may not bulge from the outer circumferential surface of the inner attachment member 11 toward the outside in the radial direction.

Further, a configuration in which the ends of the recesses 16a in the axial direction open to the end faces 15b of the stoppers 16 may be adopted.

Further, the recesses 16a may not be formed in the outer circumferential surface of the inner attachment member 11, and an outer diameter of the stopper elastic part 34 may be the same on the entire circumference.

The first disconnection portions 34c and the second disconnection portions 34d may not be formed in the stopper elastic part 34, and slits in which the inner portions 34a and the outer portions 34b come into contact with each other in the circumferential direction may be adopted as the first disconnection portions 34c, and slits in which the stopper elastic part 34 and the end elastic bodies 31 come into contact with each other in the axial direction may be adopted as the second disconnection portions 34d.

Further, the configuration in which, in the vertical cross-sectional view, the entire corresponding portion of the outer surface of the stopper elastic part 34 and the entire facing portion of the inner surfaces of the covering members 17 extend in the axial direction is shown, but may be appropriately changed, for example, such that either one of the corresponding portion and the facing portion is configured to extend in the axial direction while waving in the radial direction.

Further, the first short-circuit through-hole 21, the second short-circuit through-hole 22, the third short-circuit through-hole 23, and the fourth short-circuit through-hole 24 may not be formed in the covering members 17. The positions at which the first short-circuit through-hole 21, the second short-circuit through-hole 22, the third short-circuit through-hole 23, and the fourth short-circuit through-hole 24 are formed in the main body groove 19 may be appropriately changed without being limited to the above embodiment. The inner circumferential surface of each of the first short-circuit through-hole 21 and the second short-circuit through-hole 22 may be appropriately changed, for example, to extend in the radial direction.

Further, a configuration that extends to no more than one circumference in the circumferential direction may be adopted as the orifice passage.

Further, the configuration in which the main body groove 19 is formed in the outer circumferential surfaces of the covering members 17 is shown, but the main body groove 19 may be formed in the inner circumferential surface of the outer cylinder 12.

Further, the liquid filled in the liquid chambers 14a and 14b is not limited to the above embodiment, and for example, water and ethylene glycol may be adopted.

Further, the covering members 17 may be fitted between the intermediate elastic bodies 32 adjacent to each other in the circumferential direction, and the intermediate elastic bodies 32 may be exposed from the space between the covering members 17 adjacent to each other in the circumferential direction.

Further, the plurality of leak passages 27 and 28 may not be formed in each of the intermediate elastic bodies 32.

Further, the configuration having the main part 32a and the sub-parts 32b is shown as each of the intermediate elastic bodies 32 but may be appropriately changed, for example, such that a configuration having only either one of the main part 32a and the sub-parts 32b is adopted.

In addition, without departing from the spirit and scope of the present invention, the components in the aforementioned embodiment can be appropriately replaced by well-known components. Further, the aforementioned modifications may be appropriately combined.

According to the above aspect of the present invention, since the entire intermediate elastic bodies (32) are formed of rubber material and no reinforcing bodies are embedded in the intermediate elastic bodies, a modulus of the anti-vibration device (1), which is expressed when the inner attachment member (11) moves relative to the outer cylinder (12) and the covering member (17) in the radial direction, can be limited from excessively increasing in a direction of the radial direction, in which the pair of intermediate elastic bodies are arranged, compared to that in another direction, and portions to which a large load is applied can be limited from occurring in the end elastic bodies (31) fitted in the outer cylinder.

Moreover, since the covering members cause compressive deformation of the intermediate elastic bodies inward in the radial direction and inward in the circumferential direction, necessary rigidity can be provided to the intermediate elastic bodies despite the fact that the entire intermediate elastic bodies are formed of a rubber material without embedding reinforcing bodies in the intermediate elastic bodies.

Here, in the above aspect, a liquid having a kinematic viscosity of 50 cSt or higher at 40° C. may be filled in the liquid chambers (14a and 14b), and a leak passage (27 or 28), which provides communication between the liquid chambers by elastic deformation thereof due to internal pressures of the liquid chambers and causes the liquid to flow between the liquid chambers, may be formed in each of the intermediate elastic bodies.

In this case, since the leak passages are formed in the intermediate elastic bodies, when the internal pressure of either one of the liquid chambers exceeds a prescribed value, the communication between the liquid chambers can be provided through the leak passages, and the internal pressures of the liquid chambers can be curbed. Thus, even if the liquid having a high kinematic viscosity of 50 cSt or higher at 40° C. is filled in the liquid chambers, for example, a rise in dynamic stiffness and leakage of the liquid can be inhibited.

Further, when the internal pressures of the liquid chambers exceed a prescribed value, the intermediate elastic bodies themselves, in which the leak passages are formed, are elastically deformed. Thereby, since the liquid chambers communicate with each other, there is no need to arrange a valve body, and complication of a structure can be curbed.

Further, since walls by which the leak passages are defined in the intermediate elastic bodies are elastically deformed by the covering members, the elastic deformation amounts of the partition walls of the leak passages caused by the covering members can be adjusted, and the internal pressures under which the liquid chambers communicate with each other through the leak passages can be easily adjusted.

Since the liquid having a high kinematic viscosity is filled in the liquid chambers, a peak of an attenuation characteristic based on the liquid column resonance in the orifice passage is widened throughout a wide frequency range, and attenuation performance can be exerted in the wide frequency range.

Further, in the above aspect, the leak passage may be formed on an outer surface of each intermediate elastic body, the outer surface coming into contact with an inner surface of the covering member, and the covering member may be provided with a protrusion rib (17a) fitted in the leak passage.

In this case, since the protrusion ribs are fitted in the leak passages, despite the fact that the intermediate elastic bodies are subjected to compressive deformation by the covering members, the leak passages can be prevented from collapsing, and flowing of the liquid passing through the leak passages when the internal pressures of the liquid chambers exceed a prescribed value can be reliably secured.

Further, in the above aspect, each intermediate elastic body may include a main part (32a), and a pair of sub-parts (32b) that separately protrude outward from the main part in different directions parallel with the axial direction and that each have a volume less than the main part, and the leak passage may be provided in the main part.

In this case, since the leak passage is formed in the main part having a large volume among the main part and the sub-parts, the internal pressures of the liquid chambers under which the leak passage is opened or closed by elastic deformation of the main part can be easily and accurately adjusted.

Further, in the above aspect, the leak passage may include a plurality of leak passages formed on each intermediate elastic body at different positions in the axial direction, and at least two of the plurality of leak passages may have different flow passage lengths from each other.

Further, since at least one of the plurality of leak passages is different in flowing resistance from the other leak passages, the internal pressures of the liquid chambers under which the leak passages are opened can be set to a plurality of stages, and a rise in dynamic stiffness and leakage of the liquid can be inhibited.

Further, in the above aspect, the leak passage may include a plurality of leak passages formed on each intermediate elastic body at different positions in the axial direction, and elastic deformation amounts of partition walls of at least two of the plurality of leak passages, the partition walls being formed by the covering member, may be different from each other.

In this case, since the elastic deformation amount of the partition wall of at least one of the plurality of leak passages due to the covering members is different from those of the other leak passages, the internal pressures of the liquid chambers under which the leak passages are opened can be set to a plurality of stages, and a rise in dynamic stiffness and leakage of the liquid can be inhibited.

According to the anti-vibration device of the aspect of the present invention, portions to which a large load is applied at the end elastic bodies fitted in the outer cylinder can be inhibited from occurring.

INDUSTRIAL APPLICABILITY

The present invention can be used for an anti-vibration device that includes an inner attachment member, an outer cylinder surrounding the inner attachment member, and elastic bodies elastically coupling the inner attachment member and the outer cylinder.

DESCRIPTION OF REFERENCE SIGNS

1 Anti-vibration device
11 Inner attachment member
12 Outer cylinder
14a, 14b Liquid chamber
17 Covering member
17a Protrusion rib
27 First leak passage (leak passage)
28 Second leak passage (leak passage)
31 End elastic body
32 Intermediate elastic body
32a Main part
32b Sub-part
O Central axis

What is claimed is:
1. An anti-vibration device comprising:
an inner attachment member coupled to either one of a vibration generator and a vibration receiver;
an outer cylinder coupled to the other of the vibration generator and the vibration receiver and surrounding the inner attachment member; and
elastic bodies elastically coupling the inner attachment member and the outer cylinder,
wherein the elastic bodies include:
    a pair of end elastic bodies that are disposed at an interval in an axial direction along a central axis of the outer cylinder and are fitted in the outer cylinder; and
    a pair of intermediate elastic bodies that are separately arranged on both sides of the inner attachment member in a radial direction intersecting the central axis in a plan view viewed in the axial direction and between the end elastic bodies,
covering members, which cover spaces between the intermediate elastic bodies adjacent to each other in a circumferential direction orbiting around the central axis in the plan view from outside of the intermediate elastic bodies in the radial direction to form liquid chambers between the covering members and the inner attachment member, are arranged between the inner attachment member and the outer cylinder,
an orifice passage that provides communication between the liquid chambers is formed between the covering members and the outer cylinder,
the entire intermediate elastic bodies are formed of rubber material,
the covering members surround an entire circumference of the inner attachment member from outside thereof in the radial direction and cause compressive deformation of the intermediate elastic bodies inward in the radial direction and inward in the circumferential direction,
a liquid having a kinematic viscosity of 50 cSt or higher at 40° C. is filled in the liquid chambers,
a leak passage, which provides communication between the liquid chambers by elastic deformation thereof due to internal pressures of the liquid chambers and causes the liquid to flow between the liquid chambers, is formed in each of the intermediate elastic bodies,
the leak passage is formed on an outer surface of each intermediate elastic body, the outer surface coming into contact with inner surfaces of the covering members, and
the covering members are provided with protrusion ribs fitted in the leak passage.

2. An anti-vibration device comprising:
an inner attachment member coupled to either one of a vibration generator and a vibration receiver;
an outer cylinder coupled to the other of the vibration generator and the vibration receiver and surrounding the inner attachment member; and
elastic bodies elastically coupling the inner attachment member and the outer cylinder,
wherein the elastic bodies include:
    a pair of end elastic bodies that are disposed at an interval in an axial direction along a central axis of the outer cylinder and are fitted in the outer cylinder; and
    a pair of intermediate elastic bodies that are separately arranged on both sides of the inner attachment member in a radial direction intersecting the central axis in a plan view viewed in the axial direction and between the end elastic bodies,
covering members, which cover spaces between the intermediate elastic bodies adjacent to each other in a circumferential direction orbiting around the central axis in the plan view from outside of the intermediate elastic bodies in the radial direction to form liquid chambers between the covering members and the inner attachment member, are arranged between the inner attachment member and the outer cylinder,
an orifice passage that provides communication between the liquid chambers is formed between the covering members and the outer cylinder,
the entire intermediate elastic bodies are formed of rubber material,
the covering members surround an entire circumference of the inner attachment member from outside thereof in the radial direction and cause compressive deformation of the intermediate elastic bodies inward in the radial direction and inward in the circumferential direction
a liquid having a kinematic viscosity of 50 cSt or higher at 40° C. is filled in the liquid chambers, a leak passage, which provides communication between the liquid chambers by elastic deformation thereof due to internal pressures of the liquid chambers and causes the liquid to flow between the liquid chambers, is formed in each of the intermediate elastic bodies, each intermediate elastic body includes a main part, and a pair of sub-parts that separately protrude outward from the main part in different directions parallel with the axial direction and that each have a volume less than the main part, and the leak passage is provided in the main part.

3. An anti-vibration device comprising:

an inner attachment member coupled to either one of a vibration generator and a vibration receiver;

an outer cylinder coupled to the other of the vibration generator and the vibration receiver and surrounding the inner attachment member; and elastic bodies elastically coupling the inner attachment member and the outer cylinder, wherein the elastic bodies include:

a pair of end elastic bodies that are disposed at an interval in an axial direction along a central axis of the outer cylinder and are fitted in the outer cylinder; and a pair of intermediate elastic bodies that are separately arranged on both sides of the inner attachment member in a radial direction intersecting the central axis in a plan view viewed in the axial direction and between the end elastic bodies, covering members, which cover spaces between the intermediate elastic bodies adjacent to each other in a circumferential direction orbiting around the central axis in the plan view from outside of the intermediate elastic bodies in the radial direction to form liquid chambers between the covering members and the inner attachment member, are arranged between the inner attachment member and the outer cylinder, an orifice passage that provides communication between the liquid chambers is formed between the covering members and the outer cylinder, the entire intermediate elastic bodies are formed of rubber material, the covering members surround an entire circumference of the inner attachment member from outside thereof in the radial direction and cause compressive deformation of the intermediate elastic bodies inward in the radial direction and inward in the circumferential direction a liquid having a kinematic viscosity of 50 cSt or higher at 40° C. is filled in the liquid chambers, a leak passage, which provides communication between the liquid chambers by elastic deformation thereof due to internal pressures of the liquid chambers and causes the liquid to flow between the liquid chambers, is formed in each of the intermediate elastic bodies, the leak passage includes a plurality of leak passages formed on each intermediate elastic body at different positions in the axial direction, and at least two of the plurality of leak passages have different flow passage lengths from each other.

4. An anti-vibration device comprising:

an inner attachment member coupled to either one of a vibration generator and a vibration receiver;

an outer cylinder coupled to the other of the vibration generator and the vibration receiver and surrounding the inner attachment member; and elastic bodies elastically coupling the inner attachment member and the outer cylinder, wherein the elastic bodies include:

a pair of end elastic bodies that are disposed at an interval in an axial direction along a central axis of the outer cylinder and are fitted in the outer cylinder; and a pair of intermediate elastic bodies that are separately arranged on both sides of the inner attachment member in a radial direction intersecting the central axis in a plan view viewed in the axial direction and between the end elastic bodies, covering members, which cover spaces between the intermediate elastic bodies adjacent to each other in a circumferential direction orbiting around the central axis in the plan view from outside of the intermediate elastic bodies in the radial direction to form liquid chambers between the covering members and the inner attachment member, are arranged between the inner attachment member and the outer cylinder, an orifice passage that provides communication between the liquid chambers is formed between the covering members and the outer cylinder, the entire intermediate elastic bodies are formed of rubber material, the covering members surround an entire circumference of the inner attachment member from outside thereof in the radial direction and cause compressive deformation of the intermediate elastic bodies inward in the radial direction and inward in the circumferential direction a liquid having a kinematic viscosity of 50 cSt or higher at 40° C. is filled in the liquid chambers, a leak passage, which provides communication between the liquid chambers by elastic deformation thereof due to internal pressures of the liquid chambers and causes the liquid to flow between the liquid chambers, is formed in each of the intermediate elastic bodies, the leak passage includes a plurality of leak passages formed on each intermediate elastic body at different positions in the axial direction, and elastic deformation amounts of partition walls of at least two of the plurality of leak passages, the partition walls being formed by the covering members, are different from each other.

* * * * *